United States Patent
Nakata et al.

(10) Patent No.: US 11,287,658 B2
(45) Date of Patent: Mar. 29, 2022

(54) PICTURE PROCESSING DEVICE, PICTURE DISTRIBUTION SYSTEM, AND PICTURE PROCESSING METHOD

(71) Applicant: Sony Interactive Entertainment Inc., Tokyo (JP)

(72) Inventors: Masashi Nakata, Kanagawa (JP); Takashi Imamura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 96 days.

(21) Appl. No.: 16/918,559

(22) Filed: Jul. 1, 2020

(65) Prior Publication Data

US 2021/0011292 A1 Jan. 14, 2021

(30) Foreign Application Priority Data

Jul. 11, 2019 (JP) .............................. JP2019-129340

(51) Int. Cl.
*G02B 27/01* (2006.01)
*H04N 5/232* (2006.01)
*H04N 5/247* (2006.01)

(52) U.S. Cl.
CPC ..... *G02B 27/0172* (2013.01); *H04N 5/23238* (2013.01); *H04N 5/23296* (2013.01); *G02B 2027/014* (2013.01); *G02B 2027/0138* (2013.01)

(58) Field of Classification Search
USPC .......................................................... 345/8
See application file for complete search history.

(56) References Cited

U.S. PATENT DOCUMENTS

| | | | | |
|---|---|---|---|---|
| 6,005,493 A | * | 12/1999 | Taniguchi | G06T 7/20 340/990 |
| 2002/0012521 A1 | * | 1/2002 | Nagasaka | G06F 16/7854 386/241 |
| 2006/0043264 A1 | * | 3/2006 | Sakurai | G06T 5/006 250/208.1 |
| 2006/0119714 A1 | * | 6/2006 | Tamura | H04N 5/772 348/240.99 |
| 2008/0259097 A1 | * | 10/2008 | Hara | G09B 29/106 345/660 |
| 2011/0128367 A1 | * | 6/2011 | Yoshioka | G06F 3/04845 348/79 |
| 2011/0157385 A1 | * | 6/2011 | Hoshino | H04N 5/232945 348/208.99 |
| 2013/0165753 A1 | * | 6/2013 | Takahashi | A61B 1/00186 600/109 |
| 2014/0210972 A1 | * | 7/2014 | On | A61B 1/00188 348/65 |
| 2015/0229927 A1 | * | 8/2015 | Inada | H04N 19/167 375/240.08 |
| 2015/0302239 A1 | * | 10/2015 | Ohba | G06K 9/00261 382/154 |

(Continued)

*Primary Examiner* — Chineyere D Wills-Burns
(74) *Attorney, Agent, or Firm* — Katten Muchin Rosenman LLP

(57) ABSTRACT

A picture processing device includes a picture acquisition section that acquires data on a moving picture indicating a space to be viewed, an image extraction section that extracts an image of a target from a frame of the moving picture, and a magnification control section that causes the extracted image of the target to be displayed at a position corresponding to the target, at a magnification that is different from that of a remaining image.

16 Claims, 9 Drawing Sheets

(56) References Cited

U.S. PATENT DOCUMENTS

2016/0202888 A1* 7/2016 Yoshioka ............ G06F 3/04842
                                                        715/800
2018/0176475 A1* 6/2018 Masamura ................ G06T 5/50
2019/0306491 A1* 10/2019 Koyama ............. G06F 3/04815

* cited by examiner

FIG. 3
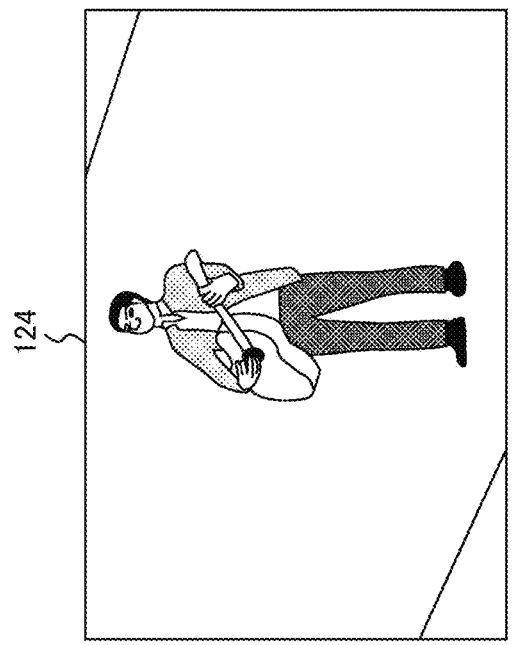
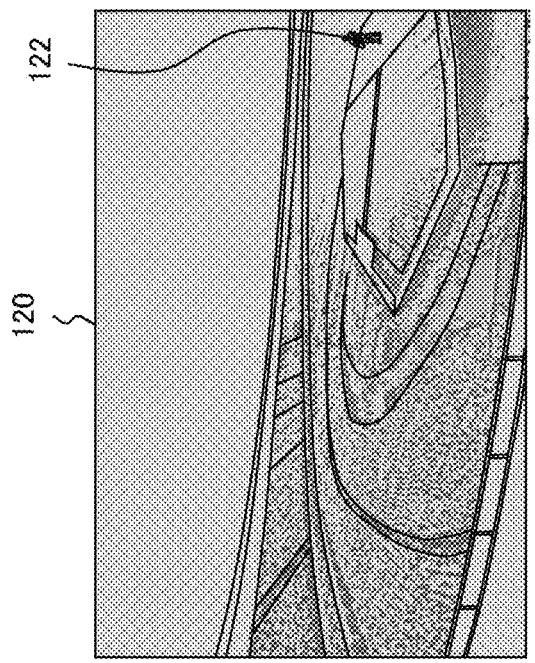

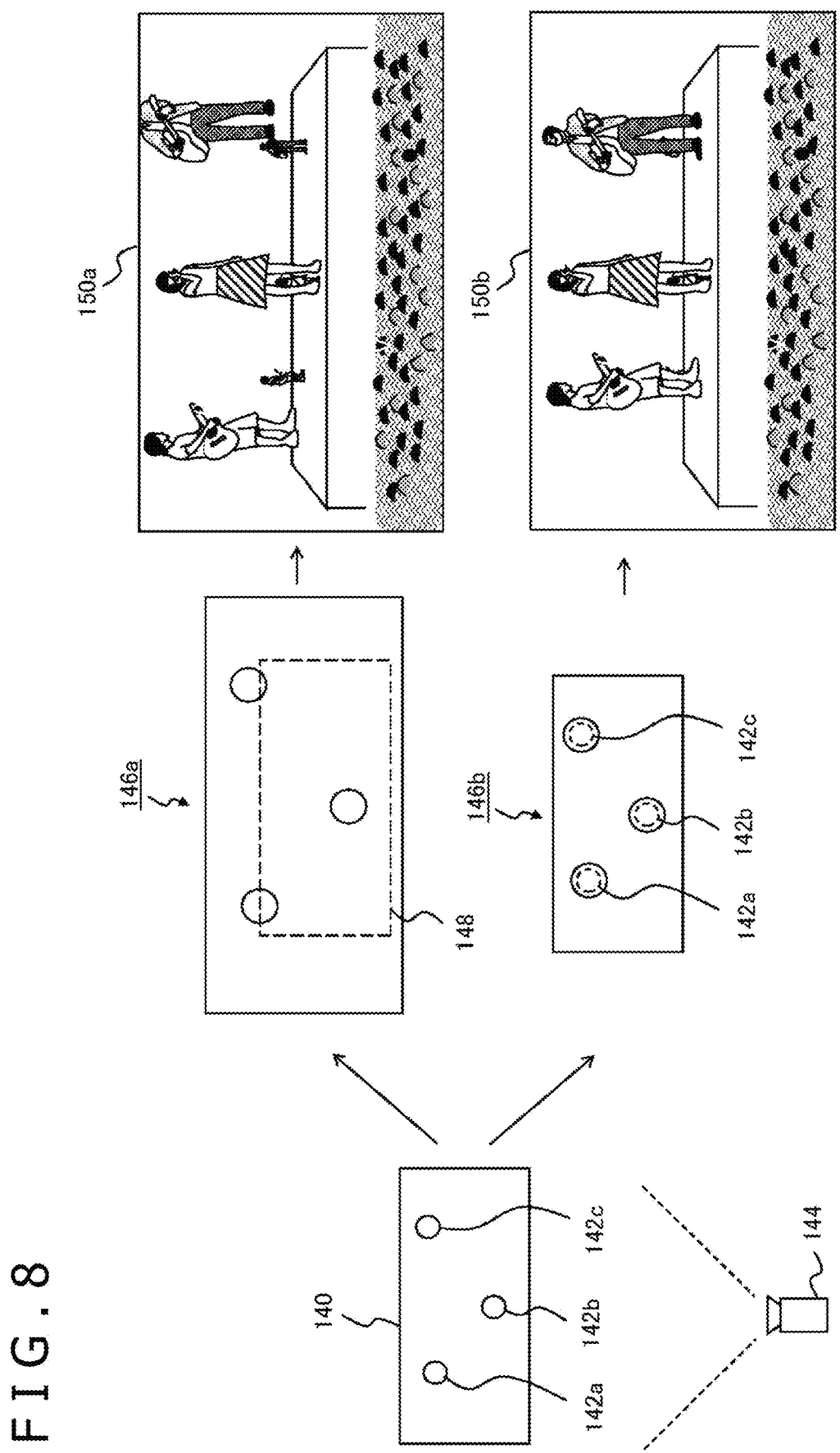

PICTURE PROCESSING DEVICE, PICTURE DISTRIBUTION SYSTEM, AND PICTURE PROCESSING METHOD

CROSS REFERENCE TO RELATED APPLICATIONS

This application claims the benefit of Japanese Priority Patent Application JP 2019-129340 filed Jul. 11, 2019, the entire contents of which are incorporated herein by reference.

BACKGROUND

The present disclosure relates to a picture processing device that processes content that uses image display, a picture distribution system, and a picture processing method.

The advance in an image processing technology and the enrichment of the network environment have provided opportunities to casually enjoy electronic content such as videos or games in various forms. For example, a head mounted display is used to display a panorama video within a visual field that corresponds to the direction of the face of a user who is wearing the head mounted display, whereby a sense of immersion in the image world can be increased, and the operability of an application of a game or the like can be enhanced. Also, in various wearable displays, it is possible to merge a virtual world with the real world by performing combining with respect to a virtual object at an appropriate position on a real-time video taken by the visual field of a user or in a real image obtained through a glasses part, for example.

SUMMARY

It is popular to, through distribution of videos of various events such as concerts and sports, enjoy the videos in real time, in a remote area, or to watch the recorded videos afterwards, irrespective of a display format. If the scale of an event is large, the distance from an audience to a to-be-viewed person such as a performer or a player is likely to become longer. Thus, a video taken from a position near the to-be-viewed person offers an advantage of making it easier to see the state of the to-be-viewed person. However, it is difficult for such a video to convey the lively atmosphere in the entire venue, the sense of unity between the to-be-viewed person and the audience, or the like. Particularly in a case where a feeling as if a person is in the audience is intended to be given by means of a head mounted display, putting more emphasis on realism leads to a dilemma that it becomes more difficult to see the to-be-viewed person.

The present disclosure has been made in view of these problems, and it is desirable to provide a content display technology in which both the visibility of a to-be-viewed person and the realism in audience seats can be achieved.

An embodiment of the present disclosure relates to a picture processing device. The picture processing device includes a picture acquisition section that acquires data on a moving picture indicating a space to be viewed, an image extraction section that extracts an image of a target from a frame of the moving picture, and a magnification control section that causes the extracted image of the target to be displayed at a position corresponding to the target, at a magnification that is different from that of a remaining image.

Another embodiment of the present disclosure relates to a picture distribution system. The picture distribution system includes a server including a target information acquisition section that extracts an image of a target from a frame of a moving picture, and a distribution processing section that transmits data on the extracted image of the target and the moving picture, and a picture processing device including a picture acquisition section that acquires the data outputted from the server over a network, and a magnification control section that causes the image of the target to be displayed at a position corresponding to the target in a frame, at a magnification different from that of a remaining image.

A still another embodiment of the present disclosure relates to a picture processing method. The picture processing method for a picture processing device includes acquiring data on a moving picture indicating a space to be viewed, extracting an image of a target from a frame of the moving picture, and causing the extracted image of the target to be displayed at a position corresponding to the target, at a magnification different form that of a remaining image.

It is to be noted that any combination of the abovementioned components, and a modification of the expression of the present disclosure to a method, a device, a system, a computer program, a recording medium having recorded a computer program therein, etc., are also effective as embodiments of the present disclosure.

According to the present disclosure, it is possible to provide content in which both the visibility of a to-be-viewed person and the realism in audience seats can be achieved in an event video.

BRIEF DESCRIPTION OF DRAWINGS

FIG. 3 is a diagram illustrating content pictures to be processed in the present embodiment;

FIG. 8 is a diagram for explaining a method for performing combining with respect to an image of a target in the present embodiment by taking a position in a three-dimensional space into consideration;

DETAILED DESCRIPTION OF THE REFERRED EMBODIMENTS

Figure 1:
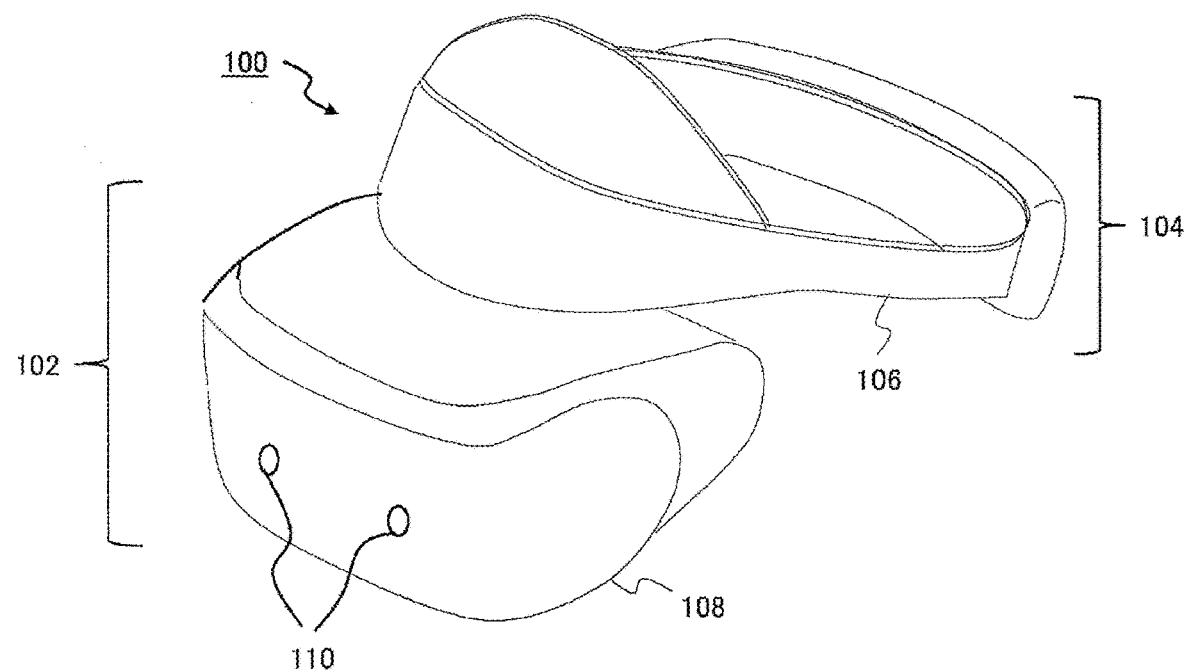
FIG. 1 is a diagram depicting an example of the external appearance of a head mounted display according to the present embodiment.

The present embodiment relates to video display of an event venue, such as a concert or a sporting competition, including an audience and a to-be-viewed person. As long as this applies, there is no particular limitation on the type of the event, the purpose of display, whether the video is a real-time one or a recorded one, the form of a display device, or the like. Hereinafter, as a representative example, an aspect of displaying a picture of a concert by means of a head mounted display will mainly be explained. FIG. 1 depicts an example of the external appearance of a head mounted display according to the present embodiment. In the example, a head mounted display 100 includes an output mechanism part 102 and a mounting mechanism part 104. The mounting mechanism part 104 includes a mounting band 106 that, when being worn by a user, surrounds the head part and fixes the device.

The output mechanism part 102 includes a casing 108 having a shape for covering the left and right eyes in a state where the user is wearing the head mounted display 100. The inside of the casing 108 includes a display panel that is disposed so as to be directly opposed to the eyes when the head mounted display 100 is worn. The inside of the casing 108 may further include a lens that is positioned between the display panel and the user's eyes when the head mounted display 100 is worn, and that enlarges a picture.

Stereo images dealing with binocular parallax may be displayed respectively in left and right regions of the display panel so that stereoscopic vision is realized.

The head mounted display 100 may further include a loudspeaker or an earphone at a position corresponding to an ear of a user when the head mounted display 100 is worn. In the example, the head mounted display 100 includes stereo cameras 110 on the front surface of the casing 108, and takes moving pictures of a surrounding real space in a visual field that corresponds to the visual line of the user. Further, the head mounted display 100 may include, inside or outside the casing 108, any one of various sensors such as an acceleration sensor, a gyro sensor, and a geomagnetic sensor, for deriving motion, the posture, the position, etc., of the head mounted display 100.

Figure 2:
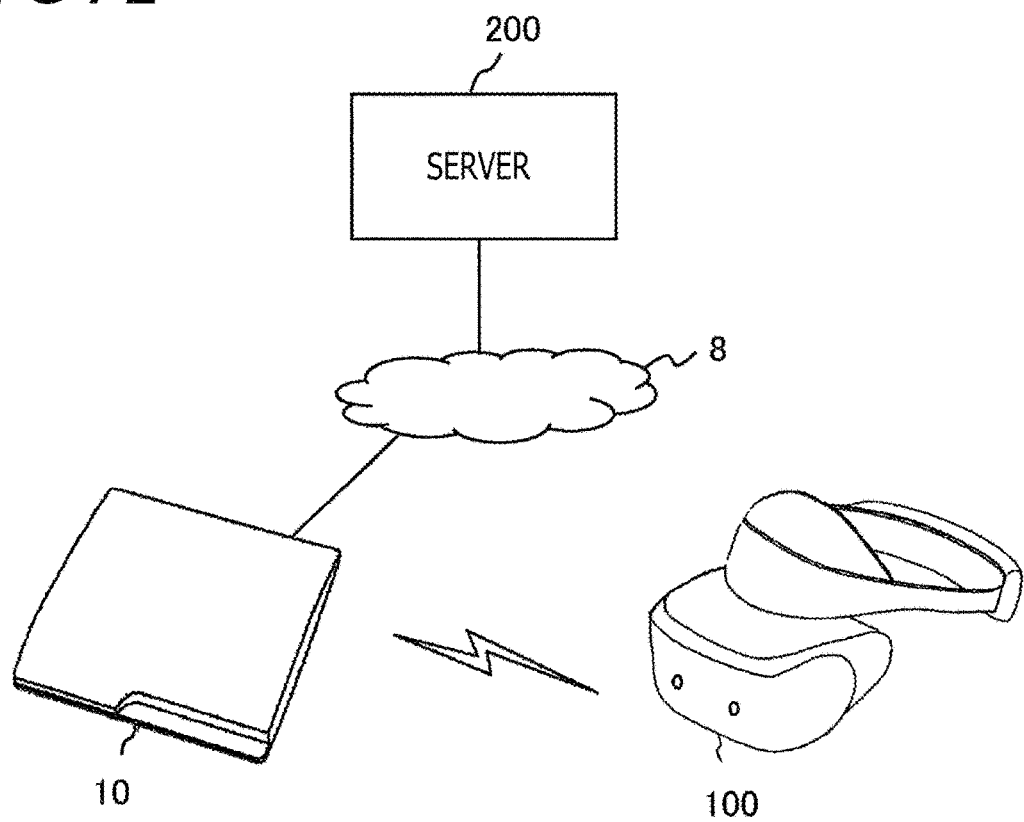
FIG. 2 is a diagram depicting a configuration example of a content processing system to which the present embodiment is applicable.

FIG. 2 depicts a configuration example of a content processing system to which the present embodiment is applicable. The head mounted display 100 is connected to a picture processing device 10 through wireless communication. However, wired connection through a USB, etc. may be used. The picture processing device 10 is connected to a server 200 over a network 8. The server 200 transmits, as content data, a video or sounds of an event such as that described above, to the picture processing device 10.

The picture processing device 10 performs necessary processing on the content data transmitted from the server 200, and transmits the processed content data to the head mounted display 100. Alternatively, the picture processing device 10 may generate picture or sound data by processing content data held in the inside thereof, or may perform predetermined processing on moving pictures being taken by the stereo cameras 110 of the head mounted display 100, and then, transmit the resultant data to the head mounted display 100. In such cases, the server 200 may be omitted. Also, the picture processing device 10 may be disposed inside the head mounted display 100.

Moreover, as described above, a device for displaying content pictures in the present embodiment is not limited to the head mounted display, and may be a flat-type display such as a television receiver, a mobile terminal, a projector, and the like. In the case where the head mounted display 100 is adopted, the picture processing device 10 continuously acquires the position or posture of the head of a user who is wearing the head mounted display 100, for example, on the basis of a measurement value obtained by a motion sensor included in the head mounted display 100 or pictures photographed by the stereo cameras 110, and thereby generates a display picture in a visual field that corresponds to the position or posture.

One of the representative examples of the abovementioned display technology is virtual reality (VR) in which a three-dimensional space representing a virtual world and a picture, among photographed panorama pictures, that corresponds to a user's visual field are displayed. In addition, the picture processing device 10 may realize augmented reality (AR) by rendering a virtual object in an appropriate position in a real-time picture being photographed by the stereo cameras 110. Alternatively, the picture processing device 10 may reproduce a content picture within a fixed visual field irrespective of motion of the head of the user.

FIG. 3 depicts content pictures to be processed in the present embodiment. In the example, a video of a concert held in a large place such as a stadium is assumed. In such case, a picture 120 that is obtained by photographing the entire venue can convey presence of a large audience and a lively atmosphere in the audience. By use of a picture such as the picture 120 obtained by wide-angle photography, the venue can be visually recognized in a visual field that corresponds to motion of the head of a user who is wearing the head mounted display 100, so that realism for giving a feeling as if the user is in an audience seat can be provided.

However, in an entire picture such as the picture 120, an image 122 of a performer becomes smaller in a larger venue. Thus, it becomes difficult to see facial expressions and performance of the performer. If a target to be displayed is set to a close-view picture 124 of a performer, the visibility is enhanced but a condition and an atmosphere outside the visual field, such as a lively atmosphere in the audience and presentation on a stage, become difficult to be conveyed. Therefore, it is difficult to simultaneously enjoy the condition of both the entire venue and a performer. Further, the close-view picture 124 is less likely to provide realism for giving a feeling as if a person is in an audience seat, and also has a problem of compatibility with the head mounted display 100.

Figure 4:
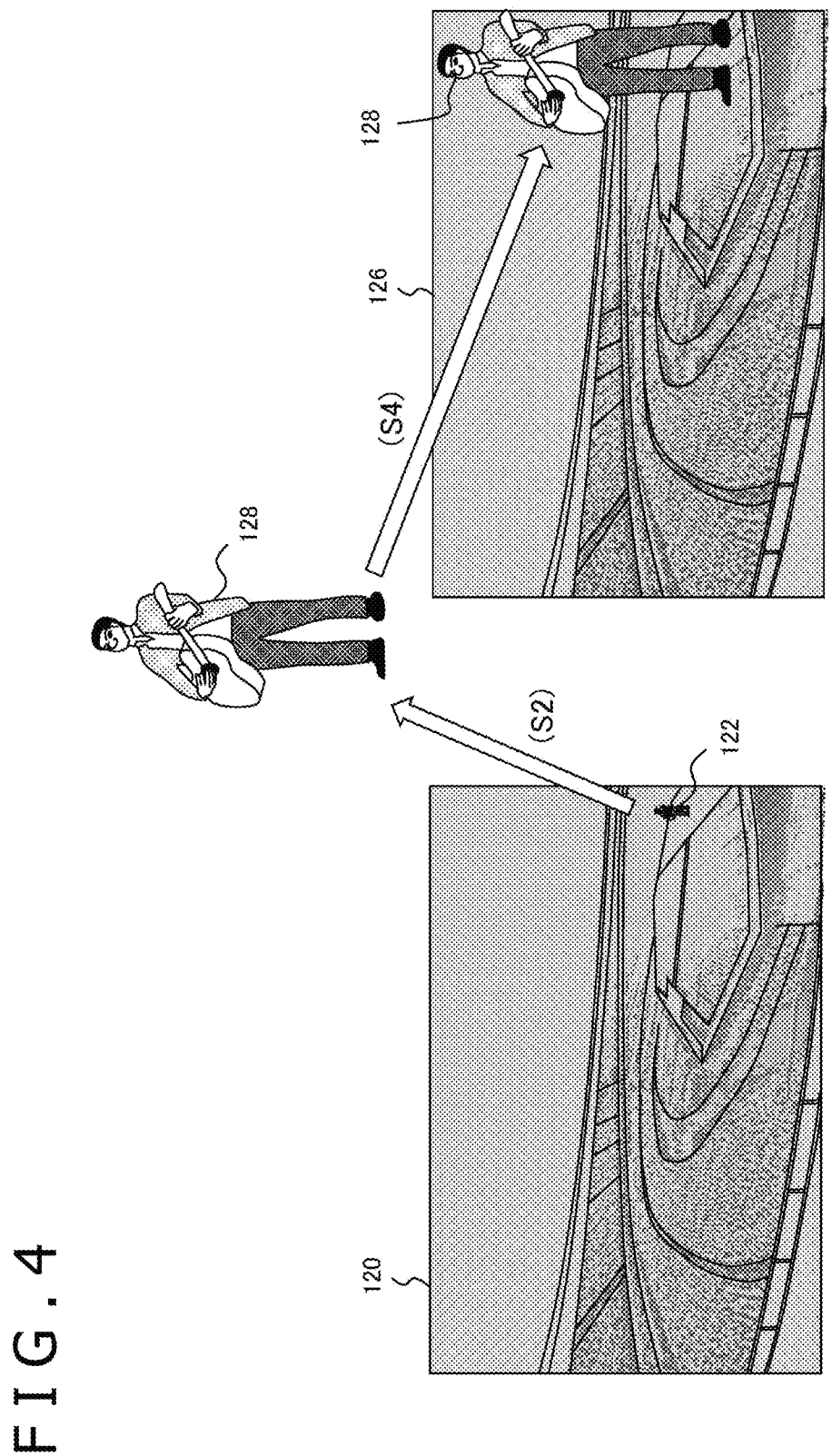
FIG. 4 is a diagram for explaining a procedure of generating a display picture in the present embodiment.

FIG. 4 is a diagram for explaining a procedure for generating a display picture in the present embodiment. In the present embodiment, an image of a predetermined target such as a to-be-viewed person in an event is displayed at a magnification different from that of the remaining images. In the example depicted in FIG. 4, an image 122 of a performer is extracted from the picture 120 obtained by photographing the entirety of a concert, and is enlarged (S2), and a resultant image 128 is subjected to combining at the position of the performer, whereby a display picture 126 is generated (S4). However, the extraction source of the image 128 is not limited to the picture 120 which is a combining destination and may be another picture that has been photographed simultaneously with the picture 120.

For example, in the close-view picture 124 depicted in FIG. 3, an image of a performer is already indicated at a high magnification. Thus, when the image is extracted and is combined with the picture 120 of the entire venue, a picture similar to the display picture 126 can be generated without involving enlargement. In the case where multiple targets are to be enlarged, images may be extracted from close-view pictures of the corresponding targets. In either case, the illustrated combining is executed for each frame of a moving picture, whereby a moving picture in which images at different magnifications are included in the same frame is displayed.

Here, the image 122 is extracted according to the outline, the magnification thereof is adjusted, and the image 122 is subjected to combining at the original position of the performer or at a position close to the original position. Accordingly, a picture having uniformity with respect to the entire venue can be obtained. Further, when the performer moves on the stage, the image 128 to be subjected to combining also moves. Therefore, as a position change in the entire venue, such movement can be recognized visually in a natural manner. Also in the case where the visual field is changed according to the motion of a user's head by means of the head mounted display 100 or the like, the visual field can be shifted naturally because the image 128 subjected to combining and the remaining images are integrated together. Accordingly, the realism is less likely to be deteriorated.

Here, at least the image 128 of the performer or the remaining images may be volumetric video which includes three-dimensional data and which can be viewed from a free viewpoint. In recent years, immersion-type media of giving a viewer a sense as if the viewer were at the site by photographing a concert or a sporting competition by means of multiple cameras, and by recording the photographed images as voxel data is coming into practical use. In the present embodiment, such technology may be applied to at least a part of a display target, or a moving picture in related art displaying all objects on a plane may be used.

Figure 5:
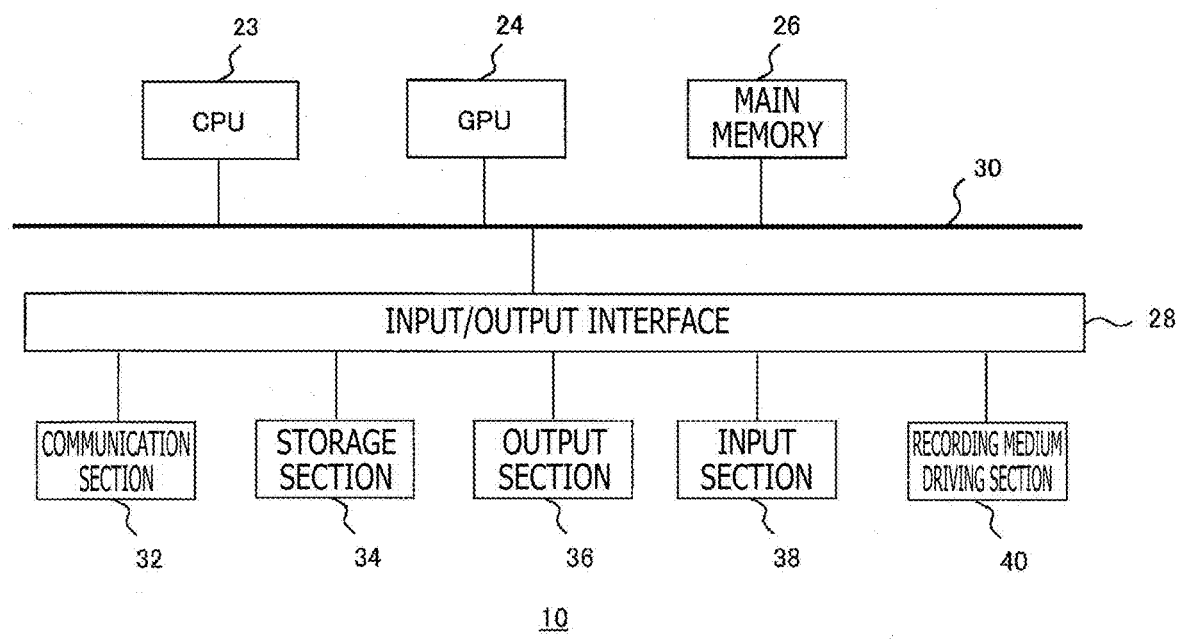
FIG. 5 is a diagram depicting an internal circuit configuration of a picture processing device according to the present embodiment.

FIG. 5 depicts an internal circuit configuration example of the picture processing device 10. The picture processing device 10 includes a CPU (Central Processing Unit) 23, a GPU (Graphics Processing Unit) 24, and a main memory 26. These sections are mutually connected via a bus 30. Further, an input/output interface 28 is connected to the bus 30. A communication section 32 that is formed of a peripheral-device interface such as a USB or that based on IEEE1934 or a network interface of a wired or wireless LAN and that establishes communication with the server 200 and the head mounted display 100, a storage section 34 that is a hard disk drive, a nonvolatile memory, or the like, an output section 36 that outputs data to the head mounted display 100, an input section 38 that receives an input of data from the head mounted display 100, and a recording-medium driving section 40 that drives a removable recording medium such as a magnetic disk, an optical disk, or a semiconductor memory, are connected to the input/output interface 28.

The CPU 23 controls the entirety of the picture processing device 10 by executing an operating system stored in the storage section 34. The CPU 23 further executes various programs which are read out from a removable recording medium and are loaded into the main memory 26, or which are downloaded via the communication section 32. The GPU 24 has a geometry engine function and a rendering processor function, executes a rendering process according to a rendering command from the CPU 23, and outputs the resultant data to the output section 36. The main memory 26 is formed of a RAM (Random Access Memory), and stores programs and data which are necessary for processes. It is to be noted that the server 200 may have the same circuit configuration.

Figure 6:
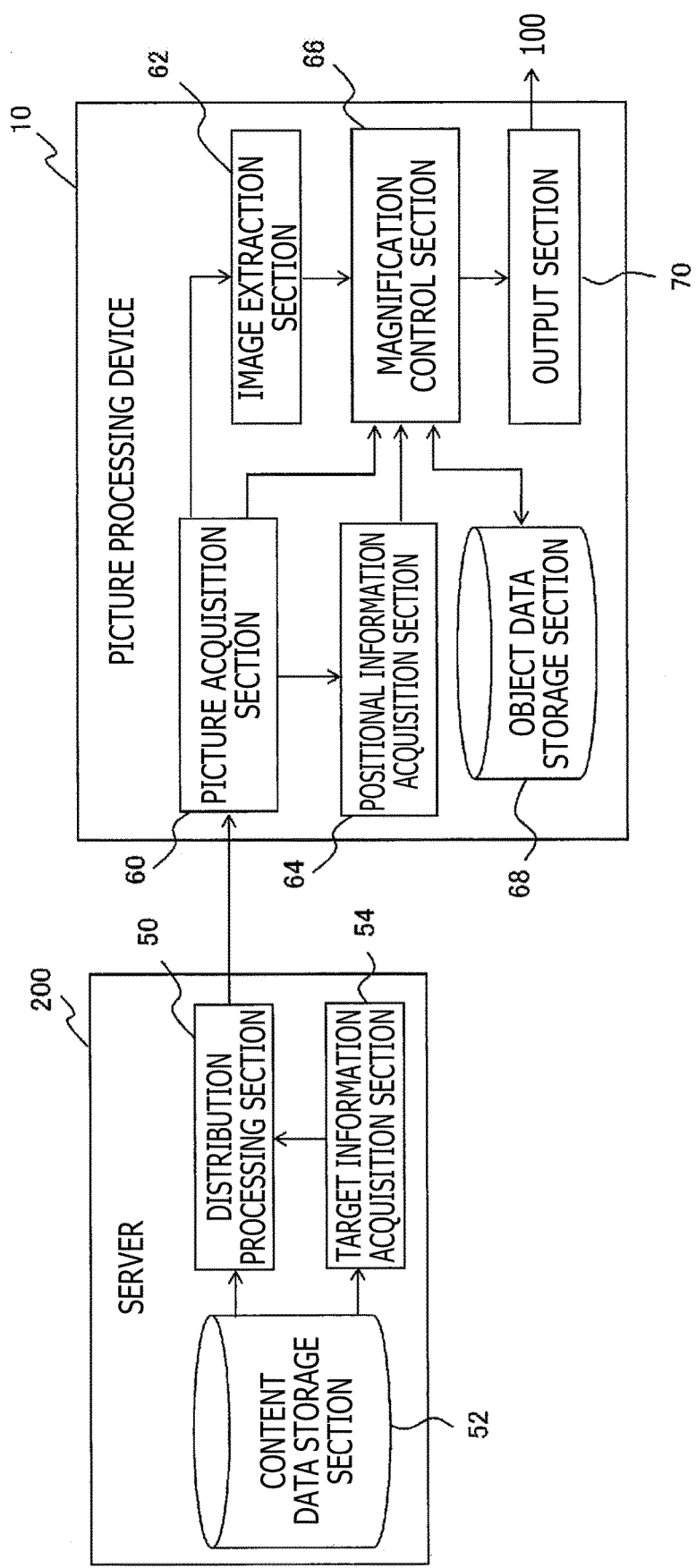
FIG. 6 is a diagram depicting a configuration of functional blocks of the picture processing device and a server according to the present embodiment.

FIG. 6 depicts a configuration of the functional blocks of the picture processing device 10 and the server 200. In terms of hardware, the functional blocks depicted in FIG. 6 can be implemented by the CPU 23, the GPU 24, the main memory 26, etc., which are depicted in FIG. 5. In terms of software, the functional blocks can be implemented by a program for exerting functions including an information processing function, a picture rendering function, a data input/output function, and a communication function, which is loaded from a recording medium into a memory. Hence, a person skilled in the art will understand that these functional blocks can be implemented in various ways, that is, by only hardware, by only software, or by a combination thereof. These functional blocks are not limited to any one of them.

The picture processing device 10 includes a picture acquisition section 60 that acquires data on a moving picture for display use, an image extraction section 62 that extracts an image of a target from a frame of the moving picture, a magnification control section 66 that displays the image of the target at a position corresponding to the target, at a magnification different from that of the remaining images, a positional information acquisition section 64 that acquires the position of the target on a picture plane or in a three-dimensional space, an object data storage section 68 that stores object data for display use, and an output section 70 that outputs data on the display picture to the head mounted display 100.

The picture acquisition section 60 acquires, from the server 200, data on a moving picture and sounds representing content that, for example, has been selected by a user. Alternatively, the picture acquisition section 60 may read out content data stored in a storage in the picture processing device 10. Then, the picture acquisition section 60 decodes and decompresses the acquired image data, as needed, and supplies the resultant data to at least the image extraction section 62 or the magnification control section 66. As described above, one moving picture may be used for display, or two or more moving pictures may be used for display.

In the case where plural moving pictures are used, the picture acquisition section 60 acquires data on moving pictures which can be represented on the same time axis and the respective visual fields of which at least partially overlap with one another. For example, the picture acquisition section 60 acquires data on plural moving pictures which are taken by plural cameras and in which the image of the same target is displayed by different sizes, for example, as depicted in FIG. 3. In addition, the picture acquisition section 60 may acquire, from the server 200, at least any one of data necessary to extract a target, information regarding the movement permitted range of the target, positional information regarding the target in a three-dimensional space, or identification information regarding a target to be displayed other than the extracted image.

The image extraction section 62 extracts an image of a predetermined target from each frame of the moving picture decoded and decompressed by the picture acquisition section 60. As described above, the image extraction section 62 desirably extracts an image along the shape of the outline thereof. Various targets may be extracted according to the subject of the moving picture, and no limitation is imposed on the number of images to be extracted simultaneously. For example, in the case of a concert, examples of a target to be extracted include not only a performer, which has been described above, but also a musical instrument, a stage setting, and a prop. Moreover, in the case of a sporting competition, examples of a target to be extracted include a player, equipment, and a scoreboard. In order to extract an image of a particular target from a picture, various technologies such as face detection, face recognition, pattern matching, background difference, and motion extraction have been put to practical use. Any of these technologies can be adopted in the present embodiment.

Data on what is a target in a picture and data to be used for extraction of an image of the target may be acquired together with content data from the server 200, or may be held in association with a content category or the like in the image extraction section 62. Also, the picture acquisition section 60 may acquire, from the server 200, region information regarding a movement permitted range of a target in a frame of a moving picture, and the image extraction section 62 may perform search only in this range, whereby the efficiency of image extraction can be increased. For example, in a picture of a concert, the region of a stage may be set as the movement permitted range.

In the case where the movement permitted range does not change on the image plane, for example, in a picture photographed by a fixed point camera, the picture acquisition section 60 may acquire information regarding the movement permitted range from the server 200 at a timing at which the content data is first acquired. In the case where switching is performed with respect to a camera to perform photography or the movement permitted range changes in the real space, the picture acquisition section 60 acquires information regarding the movement permitted range at an appropriate timing such as a timing for performing switching with respect to a camera, or on a frame-by-frame basis of the moving picture.

It is to be noted that an image which is extracted by the image extraction section 62 is not limited to an image of a target that is desired to be enlarged. That is, the image extraction section 62 may extract an image of an object other than a target determined to be highlighted, for the purpose of reducing the image. For example, the image extraction section 62 extracts an image of an object other than a performer from each frame of a moving picture of a concert. In such case, the extracted image is reduced and subjected to combining according to the position of the image of the performer so that display in a wider visual field can be performed on a display screen of the same area. Alternatively, the image extraction section 62 may extract both an image of a target to be enlarged and an image of a target to be reduced.

The magnification control section 66 enlarges or reduces the extracted image, as needed, and performs combining with respect to the image, at the position of the target in a frame of the same clock time, whereby a display picture frame in which images at different magnifications are included is generated. In the case where multiple moving pictures in which the image sizes of the same target are different are used and where combining is executed on a frame of a moving picture that is other than the moving picture used for extraction of an image of the target, as described above, the extracted image does not necessarily need to be enlarged or reduced. In the case where the extracted image is subjected to combining in the same moving picture, the extracted image is enlarged or reduced, as appropriate. An enlargement rate or reduction rate of the image is acquired together with the content data, in advance, from the server 200 by the picture acquisition section 60.

The magnification control section 66 may make a difference in the frame rate, that is, the frequency of updating pixels constituting an image, between an image of a target to be subjected to combining and the remaining images. For example, the magnification control section 66 may lower the frame rate of a moving picture which is a combining destination, and may update an image of a target to be subjected to combining, at a frequency higher than the frame rate. Alternatively, the magnification control section 66 may make a difference in resolutions between an image of a target to be subjected to combining and the remaining images. For example, the magnification control section 66 may reduce the resolution of a moving picture which is a combining destination and may perform combining with respect to an image of a target at a resolution higher than the reduced resolution. Accordingly, while the data size of a display picture is suppressed, detailed motions of a target can be represented or can be displayed with higher definition.

The magnification control section 66 may perform combining with respect to an image other than the image extracted from the moving picture by the image extraction section 62. For example, even if special effects such as laser beams, illuminations, and tapes in a concert are not precisely reproduced, there is no significant influence in most cases as long as the appearance timings of the effects are proper. Thus, the magnification control section 66 itself generates and performs combining with respect to an image of such a presentation tool (hereinafter referred to as an "additional image") so that the size of data to be transmitted from the server 200 can be reduced and a process load on the image extraction section 62 can be reduced. In addition, when the additional image is also displayed at a magnification higher than that of the remaining images such as the entire venue, etc., video expression that is more powerful than viewing from an audience seat can be realized.

In this case, the picture acquisition section 60 acquires, from the server 200, information for identifying a target to be represented by an additional image, and information regarding a magnification, a display position, and a display timing of the additional image. Then, the magnification control section 66 reads out data necessary to generate the additional image from the object data storage section 68, generates the image according to a designation made by the server 200, and performs combining with respect to the image. In this process itself, a common computer graphics technology can be used. Alternatively, data on an additional image that is actually captured in advance may be stored in the object data storage section 68 such that the magnification control section 66 reads out the data, adjusts the magnification of the additional image, as appropriate, and performs combining with respect to the additional image.

The magnification control section 66 may further perform combining with respect to a content image, such as an advertisement banner, for example, which is other than the moving picture including an object the magnification of which is to be adjusted, as described above. Also in such case, the picture acquisition section 60 acquires data on an image to be displayed and information regarding a display magnification, a display position, and a display timing, etc., thereof from the server 200, and the magnification control section 66 performs combining with respect to a picture on the basis of the acquired data and information. A part of the information such as data on the image to be displayed may be stored in the object data storage section 68 in advance.

As described above, the magnification control section 66 performs combining, in a picture frame which is a combining destination, with respect to an image of the target at a position corresponding to the target, at a different magnification. For example, the magnification control section 66 displays an enlarged image of a target within a predetermined range from the original position of the image of the target. Alternatively, the magnification control section 66 displays an enlarged image of a target so as to be present at a position where the target is present in a three-dimensional subject space represented by a moving picture.

Thus, on a frame-by-frame basis or at a predetermined time interval, the positional information acquisition section 64 acquires the position of a target in a three-dimensional subject space or the position of an image of the target on a picture plane for determining a combining position of the extracted image. In the case where a frame of a moving picture that is the same moving picture used for extraction of the image is set as a combining destination, the image extraction section 62 can simultaneously acquire the original position of the target when extracting the image. Thus, the function of the positional information acquisition section 64 can be omitted. On the other hand, in the case where a moving picture different from the moving picture from which the image of the target has been extracted is set as a combining destination, the positional information acquisition section 64 acquires, for example, the position of the image of the target in each frame of the combining destination moving picture.

In such case, the positional information acquisition section 64 may detect an image of a target by a method similar to the method which is used by the image extraction section 62. Alternatively, in the case of acquiring positional information regarding a target in a three-dimensional space, the positional information acquisition section 64 may acquire positional information transmitted together with content data from the server 200. Alternatively, the positional information may be acquired by the positional information acquisition section 64 analyzing data on a content picture or a depth image transmitted together with the content picture from the server 200.

A depth image, in which the distance from a camera to a subject is represented by a pixel value of an image of the subject, is common in picture analysis. The output section 70 outputs, at a predetermined rate, data on the display picture generated by the magnification control section 66 to the head mounted display 100. It is to be noted that the output section 70 may also simultaneously output sound data included in the content data, but illustration of a process concerning sounds is omitted.

The server 200 includes a distribution processing section 50 that distributes content data, a content data storage section 52 that stores content data, and a target information acquisition section 54 that acquires information regarding a target. In response to a request from the picture processing device 10, etc., the distribution processing section 50 reads out content data from the content data storage section 52, and transmits the content data. However, the distribution processing section 50 may instantly transmit a real-time video taken by a camera (not illustrated).

The target information acquisition section 54 acquires information that is necessary for the picture processing device 10 to extract an image of a target. Such information includes at least any one of appearance features such as the face or outfit of a performer as a target, the movement permitted range of the target, the position and size of the target on a picture plane, or the position of the target in a subject space. Among such pieces of information, information that can be acquired in advance may be stored in the content data storage section 52 so as to be read out by the target information acquisition section 54 at a stage of being transmitted to the picture processing device 10. Particularly, for recorded content, detailed information can be prepared by performing picture analysis over time.

On the other hand, in the case where a real-time video is distributed, the target information acquisition section 54 sequentially acquires positional information regarding a target on a frame-by-frame basis of a moving picture taken or at a predetermined time interval. For example, the target information acquisition section 54 acquires the distance to a subject on the basis of the principle of triangulation by using a stereo image obtained by photographing a subject space by means of a pair of cameras that is set on the left and right sides with a predetermined interval therebetween. Alternatively, the target information acquisition section 54 irradiates a subject with reference light such as infrared rays, and acquires the distance to the subject on the basis of a time taken to detect the reflection light. Such ranging technologies are widely known.

Alternatively, the target information acquisition section 54 may estimate, from the position of a head, etc., the position of a target on the upper surface of a site such as a stage on which the target is present, by separately acquiring a picture photographed at a viewing angle for overviewing a venue. It is to be noted that a part of these processes may be executed by the positional information acquisition section 64 of the picture processing device 10. For example, the server 200 side may roughly estimate the position, and the picture processing device 10 side may obtain the position with a higher resolution. Alternatively, detailed positional information is acquired by the server 200 side so that the processes at the positional information acquisition section 64 on the picture processing device 10 side may be omitted.

In addition, the target information acquisition section 54 may further acquire information that is necessary for the picture processing device 10 to display an additional image. For example, the target information acquisition section 54 acquires identification information for an actually introduced presentation tool among presentation tools such as the special effects described above, the appearing time of the actually introduced presentation tool, and the position thereof on a picture plane or in a subject space. Among such pieces of information, information that can be acquired in advance may be stored in the content data storage section 52 such that the target information acquisition section 54 reads out the information at a stage of transmitting it to the picture processing device 10.

In the case where a real-time video is distributed, the target information acquisition section 54 may acquire the abovementioned information by performing picture analysis on a frame-by-frame basis of a moving picture taken, or at a predetermined time interval. Accordingly, in addition to data on a moving picture and sounds of content, data that is necessary to extract, generate, perform magnification adjustment, and perform combining with respect to an image of a target is stored, as appropriate, in the content data storage section 52. Further, data on a content image such as an advertisement banner, that is other than the moving picture including the target, as described above, may be stored in the content data storage section 52.

Besides the content data, the distribution processing section 50 transmits, to the picture processing device 10, information regarding a target acquired by the target information acquisition section 54, a display magnification, an image extraction source, a specification of a combining destination moving picture, data on a picture of another content to be displayed simultaneously, etc. in synchronization with the content data, at an appropriate timing.

It is to be noted that, in the case where identification information regarding a target to be displayed as an additional image is to be transmitted, the distribution processing section 50 may reduce the size of data to be transmitted, by deleting an image of the target from a content picture or by increasing the compression rate of the corresponding region. Alternatively, an image of a target may be extracted by the target information acquisition section 54 of the server 200, and the distribution processing section 50 may transmit data on the image of the target in synchronization with data on the entire moving picture. In such case, the size of data to be transmitted may be increased, but the function of the image extraction section 62 in the picture processing device 10 can be omitted.

Figure 7A:
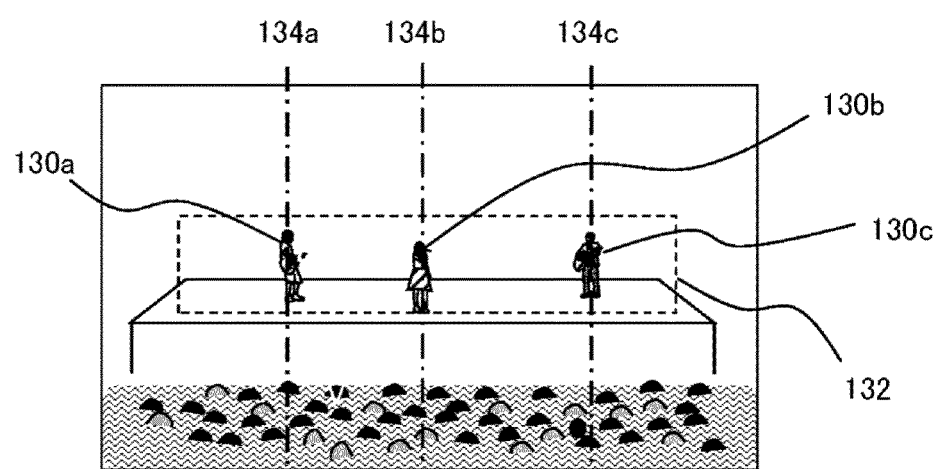
FIGS. 7A and 7B depict diagrams schematically depicting examples of a picture before and after performing combining with respect to an enlarged image of a target in the present embodiment.
Figure 7B:
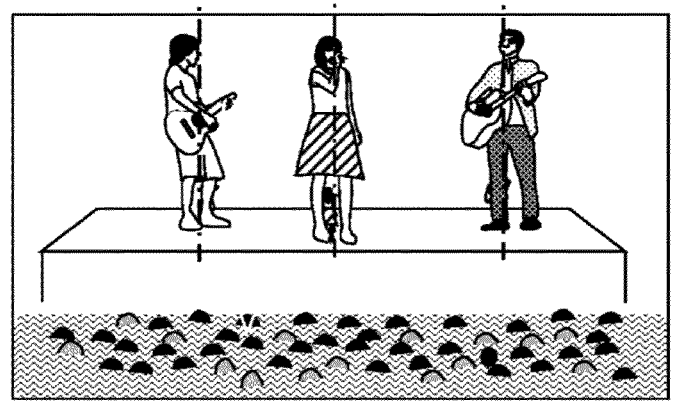

FIGS. 7A and 7B schematically depicts an example of pictures before and after performing combining with respect to an enlarged image of a target, in the present embodiment. FIG. 7A depicts one frame of a pre-combining moving picture, and represents the entire image of a concert venue including audience seats and a stage on which three performers 130a, 130b, and 130c are present. The server 200 transmits, together with data on a moving picture including such frame, information regarding a movement permitted range 132 of the performers, for example, to the picture processing device 10. In the case where a video of the concert depicted is taken by a fixed point camera, the movement permitted range 132 is a fixed region including a part on and above the stage.

In the case where videos taken by multiple cameras having different viewpoints are displayed in a switching manner, a movement permitted range is determined for each of the cameras. In such cases, when the camera(s) are set, the movement permitted range in a picture becomes clear. Thus, such information is acquired in advance, and the distribution processing section 50 transmits the information to the picture processing device 10 at an appropriate timing. In the case where a photography is performed from a dynamic viewpoint by means of a handy camera or the like, the movement permitted range changes over time. Thus, the target information acquisition section 54 detects an image of a part on and above the stage by performing picture analysis or the like and acquires the region of the corresponding movement permitted range on a frame-by-frame basis or at a predetermined time interval.

In either case, the image extraction section 62 of the picture processing device 10 can efficiently extract images of the performers 130a, 130b, and 130c, by searching images of the targets only in the motion permitting range 132 in each frame of the moving picture transmitted from the server 200. Further, the magnification control section 66 enlarges the extracted images and combines the enlarged images with the original picture so that a display picture such as that depicted in FIG. 7B is generated. Here, the combining positions are determined such that the center axes of the enlarged images fall within a predetermined range from center axes 134a, 134b, and 134c of the performers 130a, 130b, and 130c on the pre-combining picture plane.

Accordingly, an image only the size of which is increased can be displayed at a position that is not deviated from the original position on a pre-combing picture. For example, in the case where the entire region of the motion permitting range 132 in the original picture is enlarged and pasted, spaces between the performers are also enlarged. Accordingly, for example, when a performer moves to an end of the stage, the performer may go out of the display range. Further, a position on the stage does not match a position of the enlarged image so that the performer does not appear to be present on the stage. As illustrated in FIG. 7B, images of targets are separately extracted along the respective outlines thereof and are combined at positions so as to follow the corresponding original positions. Accordingly, even when the images are enlarged, a state in which the performers appear as if they are actually on the stage can be provided.

It is to be noted that, in performing combining, while a pre-enlargement image in a combining destination picture is left as it is, an enlarged image may be combined in the picture, or an enlarged image may be combined after the pre-enlargement image is deleted. Also, an image for use in combining as described above may be extracted from a moving picture that is obtained from a different viewpoint and that is taken simultaneously with the combining destination moving picture. When an image is extracted from a picture photographed by a camera closer to the stage than a camera that has photographed the picture illustrated in FIG. 7A and is subjected to combining, for example, the picture illustrated in FIG. 7B can be generated without performing enlargement. Thus, in the case where an image is extracted from a moving picture that is different from a combining-destination moving picture, the image is extracted from a frame that is photographed at the same clock time as the combining-destination frame or at a clock time different from that of the combining-destination frame by a predetermined value or less. Accordingly, motion deviation between the target and the surrounding objects or deviation between the image and sounds are prevented from being recognized.

FIG. 8 is a diagram for explaining a method for performing combining with respect to an image of a target by taking a position in a three-dimensional space into consideration in the present embodiment. A bird's-eye view of a real space that includes a stage 140 in a concert venue, performers 142a, 142b, and 142c on the stage, and a camera 144 is illustrated on the left side in FIG. 8. The performers 142a, 142b, and 142c respectively correspond to the performers 130a, 130b, and 130c depicted in FIGS. 7A and 7B when viewed from the above, for example.

Through the function of the target information acquisition section 54, the distances from the camera 144 to the performers 142a, 142b, and 142c can be obtained by a common ranging technology, as described above. If the positions of images of the performers 142a, 142b, and 142c on the plane of a picture photographed by the camera 144 and the distances from the camera 144 to these subjects can be identified, the position coordinates of the performers 142a, 142b, and 142c on a three-dimensional coordinate which is based on the camera 144 as an origin can be acquired. Such process is an inverse transformation of common computer graphics computation for projecting, onto a view screen, an object disposed in a virtual three-dimensional space.

On the other hand, in the case where the entire region of a part on and above the stage on the picture plane is extracted and enlarged, spaces between the performers are also enlarged, as explained with reference to FIGS. 7A and 7B. That is, in terms of a bird's-eye view, a state 146a in which the entire stage is enlarged is generated, and enlarged performers, which are indicated by circles, may be out of an actual stage 148. Then, as in a display picture 150a, an enlarged image may be displayed at an unnatural position, or may partially be out of the display range.

Therefore, the magnification control section 66 places the enlarged images, as in a state 146b, such that the positions of the performers 142a, 142b, and 142c in a three-dimensional space do not change. The positions of the performers 142a, 142b, and 142c in a three-dimensional space may be acquired by the target information acquisition section 54 of the server 200, as described above, or may be acquired by the positional information acquisition section 64 of the picture processing device 10. Positions, in a picture photographed by the camera 144, for displaying the images of the performers 142a, 142b, and 142c whose positions in the three-dimensional space are known, can easily be identified by the abovementioned projective transformation of computer graphics.

In the case where a stereoscopic video is displayed by means of the head mounted display 100, the parallax between left and right images are prevented from changing before and after enlargement so that an enlarged image of a performer is represented as being present at the same position on the stage. It is to be noted that, instead of precisely obtaining the positions in a three-dimensional space as described above, the contact point between a performer and the stage, that is, the standing point, may be identified, and the enlarged image may be put at the same position/without changing the position. Accordingly, a display picture 150*b* in which the performers appear as if they are actually on the stage can be generated. It is to be noted that, in such case as well, while a pre-enlargement image in a combining destination picture is left as it is, an enlarged image may be superimposed thereon, or the enlarged image may be subjected to combining after the pre-enlargement image is deleted.

Figure 9:
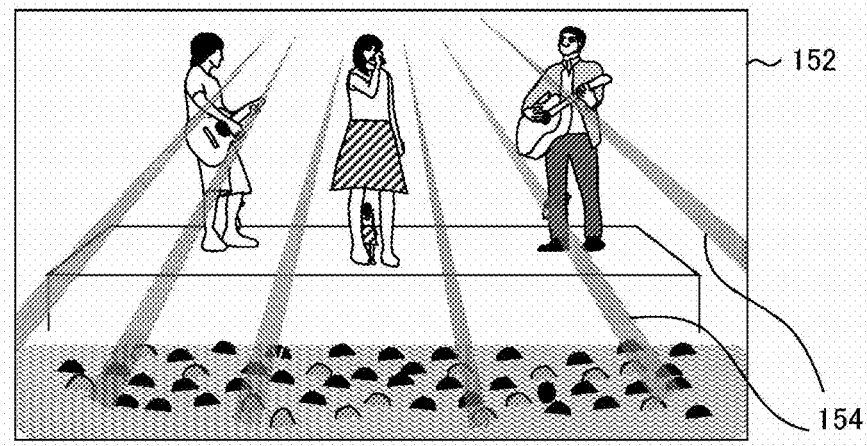
FIG. 9 is a diagram schematically depicting an example of a picture obtained by the picture processing device performing combining with respect to an additional image according to the present embodiment.

FIG. 9 schematically depicts an example in which the picture processing device 10 executes combining with respect to an additional image. In the example, the magnification control section 66 enlarges and performs combining with respect to an image of a performer on a picture 152 of a concert, as illustrated in FIGS. 7 and 8. Further, the magnification control section 66 generates and performs combining with respect to an image 154 of a laser beam as an additional image. In such case, the server 200 transmits identification information indicating the laser beam and information regarding a display time period and a display position, etc., to the picture processing device 10, as described above.

In addition, according to a target to be displayed as an additional image, information regarding a color, the size, and a time change thereof is transmitted, as appropriate. The target may be an object that has actually appeared in a venue, or a virtual object. Further, the target may be displayed at a size equal to the actual size or may be displayed after being enlarged. For example, in the case where a presentation tool actually used in a venue is combined, the server 200 side transmits data in which an image of the presentation tool has been deleted, the compression rate of the corresponding region has been increased, or a frequency component of the presentation tool has been limited. Accordingly, the data size can be reduced.

Further, when a presentation tool is displayed after being enlarged to have a size larger than the actual one, the presentation can be emphasized. It is to be noted that FIG. 9 depicts an example of a picture in which both enlargement of and combining involving images extracted from moving picture frames and generation of and combining involving additional images have been executed, but the present disclosure is not limited to such example, and the magnification control section 66 may execute either the enlargement and combining or the generation and combining alone. Moreover, the magnification control section 66 may perform combing with respect to an image of another content such as an advertisement banner, as described above.

Figure 10:
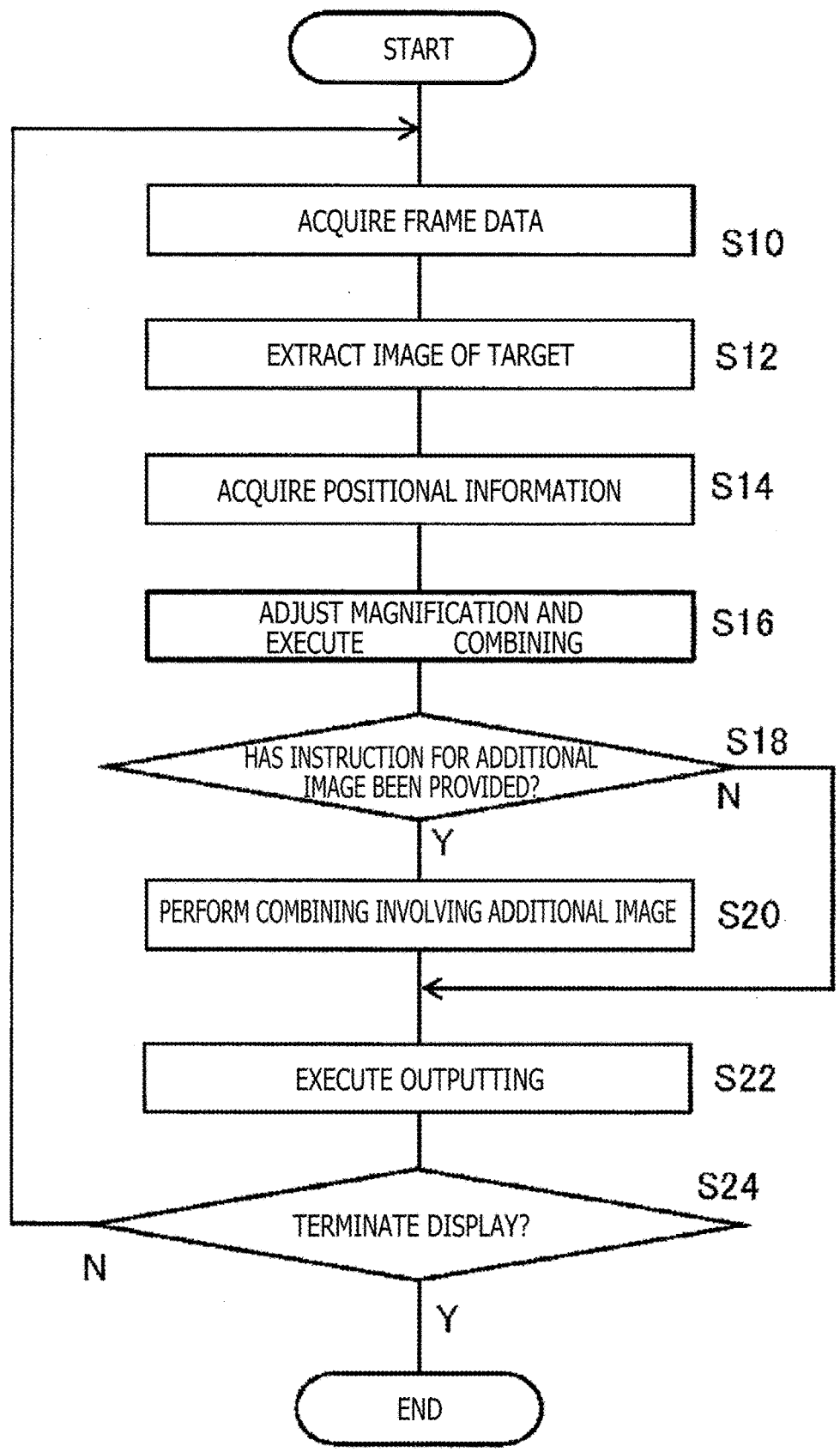
FIG. 10 is a flowchart of a process procedure of displaying a content picture by means of the picture processing device according to the present embodiment.

Next, operation of the picture processing device 10 that is implemented by the configuration described so far will be explained. FIG. 10 is a flowchart of a processing procedure in which the picture processing device 10 displays content pictures in the present embodiment. This flowchart starts upon a user's input of a selection of content that a user wearing the head mounted display 100 desires to view to the picture processing device 10. First, the picture acquisition section 60 of the picture processing device 10 acquires data on a first frame of a moving picture of the selected content (S10).

Such data may be one transmitted from the server 200 or one held in the picture processing device 10, as described above. However, in the example, such data is assumed to be acquired from the server 200. Further, the picture acquisition section 60 may acquire plural frames, of plural moving pictures taken from different viewpoints, photographed at the same clock time. The image extraction section 62 extracts an image of a predetermined target from a frame of a moving picture for use in combining (S12). When doing so, the image extraction section 62 may, on the basis of information that indicates a movement permitted range of the target and that has been transmitted together with the picture data from the server 200, perform image search only in the movement permitted range.

In parallel with the above, the positional information acquisition section 64 acquires positional information regarding the target in a frame of a combining destination moving picture, or, for example, the position of the center axis of an image thereof (S14). In the case where the moving picture from which the image has been extracted in S12 is a combining destination, S14 may be omitted because the position is clarified in association with extraction of the image. Alternatively, the positional information acquisition section 64 may acquire the position of the target in a three-dimensional space. Such positional information may be acquired by obtaining data transmitted from the server 200 or may be acquired by the positional information acquisition section 64 itself through picture analysis.

The magnification control section 66 appropriately adjusts the magnification of the image of the target extracted in S12, as needed, and performs combining with respect to the image at the position of the target acquired in S14 (S16). More specifically, the magnification control section 66 determines a combining position such that the center axes of the image of the same target before and after combining fall within a predetermined range on the picture plane. Alternatively, the magnification control section 66 determines the combining position such that the positions of the same target before and after combining fall within a predetermined range in a three-dimensional space. In the case where the server 200 has provided an instruction to perform combining with respect to an additional image (Y in S18), the magnification control section 66 generates and performs combining with respect to the corresponding additional image on the basis of identification information or positional information transmitted from the server 200 (S20).

Further, when an image of another content, such as an advertisement banner, not including a target needs to be displayed, the magnification control section 66 further performs combining with respect to the image. Here, the image of the other content is displayed in a region located at a predetermined distance or longer from the position of the target which has been identified in S14. Accordingly, the target can be prevented from being hidden. Data on the image to be subjected to combining may be acquired from the server 200 each time, or may be held on the picture processing device 10 side. A timing for displaying this image may be specified by data on the image of the target-including content or may be designated by the server 200 each time.

In the case where any additional image or another content does not need to be subjected to combining, S20 is omitted (N in S18). Data on a display picture in which the magnification of the target is different from that of the other images, as described above, is outputted from the output section 70 to the head mounted display 100 (S22). S10 to S22 are repeated for each frame of the moving picture of the content (N in S24). When the moving picture of the content is ended or when display needs to be terminated because the user performs a stop operation, all the processes are ended (Y in S24).

According to the present embodiment described so far, an image of a predetermined target is displayed in a moving picture of content, at a magnification different from that of the other images. Accordingly, while the entire image of a place to be displayed is grasped, the visibility of a particular target can be increased. For example, while feeling a lively atmosphere in the venue of a concert, a sporting competition, or the like, a user can check the details of expressions and actions of a person being viewed from an enlarged image of the person being viewed. At this time, the image is extracted substantially along the outline of the target, and then, the image is subjected to combining at a position corresponding to the original image in each frame, whereby a state including movement of the target can be reproduced with use of a large image such that the reproduced state is similar to an actual state.

In particular, in image representation using a head mounted display, the visibility of a target can be increased while the realism for giving a feeling as if a person is in an audience seat is not deteriorated. In addition, the position of a target in a three-dimensional space is identified, and an image is put at substantially the same position. Accordingly, even in the case where a stereoscopic video is presented, only the size of the image can be adjusted without giving any strangeness.

Moreover, a presentation tool such as a special effect is designated on the basis of identification information so that, when being displayed, an image thereof is generated and subjected to combining by use of object data, etc., that is prepared in advance. Accordingly, a process load of extracting images can be reduced, and further, the size of the original content data can be reduced so that the transmission band can be decreased when such data is transmitted from a server. In addition, the magnification of an additional image can also be changed freely. Thus, an additional image is enlarged, as needed, whereby the visibility can be increased, or powerful video expression can be realized.

The present disclosure has been explained above on the basis of the embodiment. The above embodiment is an exemplification. A person skilled in the art will understand that various modifications can be made for a combination of the components and the processes, and that the present disclosure also encompasses such modifications.

For example, an aspect of adjusting the magnification of an image of a target extracted from a moving picture, as appropriate, and combining the image of the target with the same moving picture or with another simultaneously photographed moving picture, has mainly been explained in the present embodiment. Meanwhile, regarding glasses for transmitting a real-world image therethrough, AR glasses for displaying a virtual object so as to match with a real image may be used. In such case, except for an image of a target, the remaining displayed images are images having transmitted through the glasses. The magnification control section 66 of the picture processing device 10 extracts an image of a target from a frame of a moving picture simultaneously obtained by photographing a space which is being viewed by a user through the AR glasses, and displays the extracted image at a position corresponding to the target image, among real images being viewed through the AR glasses, at a magnification different from that of the real images. Also in such case, effects similar to those that have been described in the present embodiment can be provided.

What is claimed is:
1. A picture processing device comprising:
a picture acquisition section that acquires data on a moving picture indicating a space to be viewed;
an image extraction section that extracts an image of a target from a frame of the moving picture; and
a magnification control section that causes the extracted image of the target to be displayed at a position corresponding to the target, at a magnification that is different from that of a remaining image.

2. The picture processing device according to claim 1, wherein
the picture acquisition section acquires data on a moving picture taken by one camera, and
the magnification control section combines an enlarged image of the target with a frame of the moving picture used by the image extraction section to extract the image of the target.

3. The picture processing device according to claim 1, wherein
the magnification control section causes an enlarged image of the target to be displayed within a predetermined range from an original position of the image of the target.

4. The picture processing device according to claim 1, further comprising:
a positional information acquisition section that acquires positional information regarding a target in a three-dimensional subject space, wherein
the magnification control section causes an enlarged image of the target to be displayed so as to be present within a predetermined range from the target in the subject space.

5. The picture processing device according to claim 1, wherein
the magnification control section reduces, in a frame of the moving picture, an image other than the image of the target that is determined as a target to be highlighted, and combines the reduced image with the image of the target.

6. The picture processing device according to claim 1, wherein
the picture acquisition section acquires the data on the moving picture and information concerning a movement permitted range of the target, from a server over a network, and
the image extraction section searches the image of the target in a region that is delimited on a basis of the information concerning the movement permitted range.

7. The picture processing device according to claim 1, wherein
the picture acquisition section acquires the data on the moving picture and identification information regarding the target, from a server over a network, and
the magnification control section further causes an image of the target corresponding to the identification information to be displayed.

8. The picture processing device according to claim 1, wherein
the picture acquisition section acquires data on plural moving pictures which are taken by plural cameras and which are different in image sizes of an identical target, and
the magnification control section combines the extracted image of the target with a frame of a moving picture that is different from the moving picture used by the image extraction section to extract the image of the target.

9. The picture processing device according to claim 1, wherein
the picture acquisition section acquires data on a moving picture obtained by photographing an event venue including an audience and a to-be-viewed person, and
the magnification control section enlarges at least an image of the to-be-viewed person or an image of a presentation tool as the target, and displays the enlarged image.

10. The picture processing device according to claim 1, wherein
the magnification control section displays, as a volumetric image, the image of the target or the remaining image.

11. The picture processing device according to claim 1, wherein
the magnification control section further causes a content picture which is not a moving picture including the target to be displayed.

12. The picture processing device according to claim 1, wherein
the magnification control section combines the image of the target with a frame of the moving picture, and updates the image of the target at a frequency higher than that of the remaining image.

13. The picture processing device according to claim 1, wherein
the magnification control section combines the image of the target with a frame of the moving picture, at a resolution higher than that of the remaining image.

14. The picture processing device according to claim 1, wherein
in a corresponding region in a visual field of an augmented-reality glass worn by a user who is viewing a space represented by the moving picture, the magnification control section displays the extracted image of the target so as to have a size that is different from an apparent size of the target.

15. A picture distribution system comprising:
a server including
a target information acquisition section that extracts an image of a target from a frame of a moving picture, and
a distribution processing section that transmits data on the extracted image of the target and the moving picture; and
a picture processing device including
a picture acquisition section that acquires the data outputted from the server over a network, and
a magnification control section that displays the image of the target at a position corresponding to the target in the frame, at a magnification different from that of a remaining image.

16. A picture processing method for a picture processing device, the method comprising:
acquiring data on a moving picture indicating a space to be viewed;
extracting an image of a target from a frame of the moving picture; and
displaying the extracted image of the target at a position corresponding to the target, at a magnification different from that of a remaining image.

* * * * *